US006780002B2

(12) United States Patent
Aengenvoort

(10) Patent No.: US 6,780,002 B2
(45) Date of Patent: Aug. 24, 2004

(54) SPREADER FOR WOOD CHIPS, WOOD PARTICLE AND SAWDUST

(75) Inventor: Dieter Aengenvoort, Weeze (DE)

(73) Assignee: Siempelkamp Maschinen- und Anlagenbau GmbH & Co. KG, Krefeld (DE)

( * ) Notice: Subject to any disclaimer, the term of this patent is extended or adjusted under 35 U.S.C. 154(b) by 169 days.

(21) Appl. No.: 10/135,892

(22) Filed: Apr. 30, 2002

(65) Prior Publication Data

US 2002/0168441 A1 Nov. 14, 2002

(30) Foreign Application Priority Data

May 11, 2001 (DE) ........................................ 101 22 971

(51) Int. Cl.$^{7}$ ................................................ B29C 31/00

(52) U.S. Cl. ....................... 425/449; 209/235; 209/236; 209/673

(58) Field of Search .............................. 425/80.1, 82.1, 425/83.1, 224, 447, 449; 209/235, 236, 673

(56) References Cited

U.S. PATENT DOCUMENTS

| | | | | | |
|---|---|---|---|---|---|
| 4,063,858 | A | * | 12/1977 | Axer et al. | 425/81.1 |
| 4,068,991 | A | * | 1/1978 | Ufermann et al. | 425/81.1 |
| 4,315,722 | A | * | 2/1982 | Ufermann | 425/83.1 |
| 4,388,055 | A | * | 6/1983 | Ufermann | 425/80.1 |
| 4,650,409 | A | * | 3/1987 | Nistri et al. | 425/82.1 |
| 5,202,133 | A | * | 4/1993 | Pesch et al. | 425/83.1 |
| 5,386,914 | A | * | 2/1995 | Eramaja et al. | 209/673 |

FOREIGN PATENT DOCUMENTS

| | | | | |
|---|---|---|---|---|
| DE | 4439653 A1 | * | 5/1996 | B27N/3/00 |
| WO | WO 01/66324 A1 | * | 9/2001 | B27N/3/14 |

* cited by examiner

*Primary Examiner*—Robert B. Davis
(74) *Attorney, Agent, or Firm*—Herbert Dubno

(57) ABSTRACT

At the end of an array of rollers of a spreading head for wood particles for the production of mats to form particleboard, rollers of the array are driven at a higher speed than the rollers of the fine-particle spreading portion and baffles are provided below the higher speed rollers to scatter the particles backwardly into the fine-particle region and form an intimate mixture of the coarse and fine particles.

17 Claims, 4 Drawing Sheets

SPREADER FOR WOOD CHIPS, WOOD PARTICLE AND SAWDUST

FIELD OF THE INVENTION

My present invention relates to a spreading apparatus for the spreading of a layer of a spreadable material, especially wood chips, wood fibers, sawdust or the like upon a spreading conveyor belt upon which the layer is to be formed. More particularly, the invention relates to a spreading apparatus for use in the production of mats or the like of the spreadable material, with or without a binder, for use in the production of particleboard, fiberboard or generally wood material boards and where the spreading apparatus can have a storage bin associated with a dosing or metering device by means of which the spreadable material is deposited on the conveyor belt.

BACKGROUND OF THE INVENTION

In such apparatus it is common to provide the dosing device so that it is located above the conveyor belt and at the bottom of the storage bin and can include a spreading roller array which has at least one fine-material spreading portion and, downstream thereof in the direction of travel of the deposited layer and the material to be spread on the array, a coarse-material spreading portion.

A prior art spreading apparatus of this type has the spreading layer array so constructed and arranged that it separates a spreadable material. At the beginning of the spreading roller array and thus in the fine-material spreading portion, fine material from the bin, for example to form a cover layer in the mat or pressed board, is initially deposited while at the end the spreading roller array or stretch and thus in the coarse-material spreading region, practically only coarse material from the bin is deposited upon the conveyor to form a middle layer.

The spreadable material usually consists of glue-covered particles. However, the bonding of the coarse material in the middle layer is relatively small in spite of the presence of the adhesive. As a consequence, the transverse tensile strength of the particleboard (chipboard or fiberboard or like wood material boards) which are made from the mats can be limited.

To avoid the reduction in the transverse tensile strength can result from the limited bonding in the coarse material layer, the spreading apparatus can be made with a spreading roller stretch having upper and lower parts and the latter can be located in the lower third of the spreading stretch beneath the upper part. Thus, the upper part can initially deposit fine material on the conveyor and this fine layer can be measured by a coarse-material middle layer or a mixture of fine material and coarse material to form the middle layer. In a subsequent part of the spreading stretch, initially a mixture of coarse material and fine material can be deposited to complete the middle layer. Only fine material can be deposited to provide an upper cover layer.

This system, while it can partially solve the problem mentioned previously, has the drawback that the fine material distribution in the middle layer is unsatisfactory and furthermore, because of the separation of the layer deposition between upper and lower parts, the spreading apparatus itself is of expensive construction and can be expensive to operate.

OBJECTS OF THE INVENTION

It is, therefore, the principal object of the present invention to provide a spreading apparatus of the type which comprises a conveyor belt adapted to receive the layer of spreadable material, a storage bin for the spreadable material and dosing device subdivided along its roller array into a fine-material spreading part and a coarse-material spreading part, whereby the disadvantages of earlier systems are avoided.

A more specific object of this invention is to provide a spreading device in which the middle layer can have an especially fine distribution of the fine material thereof so that the transverse tensile strength of the resulting board can be increased without increasing the production cost or the capital cost for the spreading apparatus.

Yet another object of the invention is to provide an improved spreader which can have advantages for the production of mats or layers of particles for use in the production of particleboards with continuous or cycling presses.

SUMMARY OF THE INVENTION

These objects are achieved in accordance with the invention with a spreader for producing a layer of spreadable material and especially wood chips, wood fibers, sawdust or other wood particles for the production of wood particleboard, in which the spreader comprises:

- a conveyor belt adapted to receive a layer of a spreadable material;
- a storage bin above the belt and containing a quantity of spreadable material;
- a dosing device receiving spreadable material from the storage bin and depositing spreadable material in a layer on the conveyor belt, the dosing device comprising an array of mutually parallel spreading rollers extending generally transversely of a direction of displacement of the belt and between which the spreadable material is scattered onto the belt, the spreadable material passing over the array of rollers, the array of rollers including a fine-material spreading portion within which a fine material fraction of the spreadable material is scattered onto the belt and a coarse-material spreading portion in which a coarse material fraction of the spreadable material is scattered onto the belt; and
- a drive for driving at least one of the spreading rollers in the coarse-material spreading portion at an angular velocity higher by a predetermined amount than that the spreading rollers of the fine-material spreading portion.

According to the invention, therefore, the coarse-material spreading portion has at least one roller of the array and, advantageously, a plurality of rollers of the array which are driven at an angular velocity which is higher than the angular velocity of the rollers of the fine-material spreading portion by a predetermined degree. As a consequence of the coarse-material rollers being driven at a higher speed, a portion of the coarse material is scattered opposite the direction of travel of the spreadable material and back into the fine-material spreading part.

This results in an especially intimate mixture between fine material and coarse material below the fine material spreading part and the production of a middle layer or at least a part or half of the middle layer which will overlap and intimately blend with the fine material of the fine-material part.

The result is that the fine material has the function of a binder for the coarse material and such that the intimate mixture of the fine material and coarse material which takes place where the coarse material is drawn back onto the fine material has an especially fine distribution of any binder which may be provided on the particle. The result is increased transverse tensile strength of the pressed particleboard produced in the process.

The spreader of the invention thus permits the formation of a cover layer or the like substantially exclusively from the fine material and an intermediate layer which at least initially is a result of an intimate mixing of fine material and coarse material or can be a fine material/coarse material mixture throughout. However, the spreader of the invention can be provided as a middle layer spreader for use when the lower cover layer and, if desired, an upper cover layer, are provided by separate fine material spreaders. In this case, the middle layer is formed at least in part as an intimate mixture of fine and coarse material.

The apparatus for producing the mat can include as many spreaders as may be necessary, and for example, the spreader of the invention can be used upstream of or downstream of further intermediate layer spreaders or for the generation of an intermediate layer half and other spreaders can be provided for applying the upper and lower cover layers or, if desired, even additional intermediate layers of the fine material.

The coarse material portion of the array of rollers may have a plurality of rollers operated at the increased speed and these can alternate with rollers which are operated at the speed of the fine-spreader rollers.

The means for casting the coarse particles back in the direction opposite that in which the particles are traveling on the array of rollers can include baffles which are located below the higher speed coarse-material rollers.

According to a feature of the invention, these baffles have surfaces curved to correspond to the curvature of the higher-speed coarse material rollers and spaced at a fixed distance from them. The spacing between the baffle surfaces and the high-speed spreading rollers and the curvatures can be so selected that an optimum scattering of the coarse particles and an optimum degree of spread thereof backwards can be achieved. What is important of course is that the backward scattering of coarse particles reaches at least to a region below the fine-material spreading parts.

The provision of a plurality of higher speed coarse-spreading rollers, preferably alternating with slower speed rollers in the coarse-spreading part of the roller array, can ensure that various mats of spreadable material, for example, chips, fibers and sawdust, can be used with assurance that the desired distribution of coarse and fine particles will be achieved.

The provision of slower-speed rollers between the higher-speed rollers has the advantage that it permits further fine-material scattering on the one hand and on the other hand a reduction or avoidance of intersection of the back-scattering trajectories of the particles.

It has been found to be advantageous, moreover, to increase the spacing between the fine-spreader rollers toward the end of the fine-spreader part of the array or over the entire length thereof so that at least at the upstream end of this part of the array, there is practically an exclusive spreading of the fine material while toward the end of that part of the array, both fine material and a fine-particle fraction of the coarse material will begin to deposit together.

It has been found to be advantageous, moreover, to drive the higher-speed rollers with a speed which is 2 to 12 times higher than the speed of the rollers of the fine-particle part and thereby ensure the desired degree of scattering of the coarse particles. Materials which are undesirable in the mat, for example, particles of too large a size, metal particles, clumps of glue or mixtures of glue with particles may be collected at the end of the roller array.

It is also possible to operate with speeds of higher-speed rollers which are 5 to 40 times greater than the speeds of the fine-particle spreader rollers and the fine-particle spreader rollers can have speeds of 5 RPM to 25 RPM by way of example. The higher-speed rollers can be driven at speeds of 150 RPM to 200 RPM. The speeds of the rollers of the parts of the array may be adjustable and coupled with one another, and with the speed of the conveyor belt and/or with the speed of a feed roller depositing the spreadable material on the array of rollers and/or a feed belt at the bottom of the bin. Thus when the conveyor spreader rollers can operate at respective speeds in which at least the coarse-spreader rollers can be automatically driven at a speed higher by the aforementioned factor than the fine-spreader rollers.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
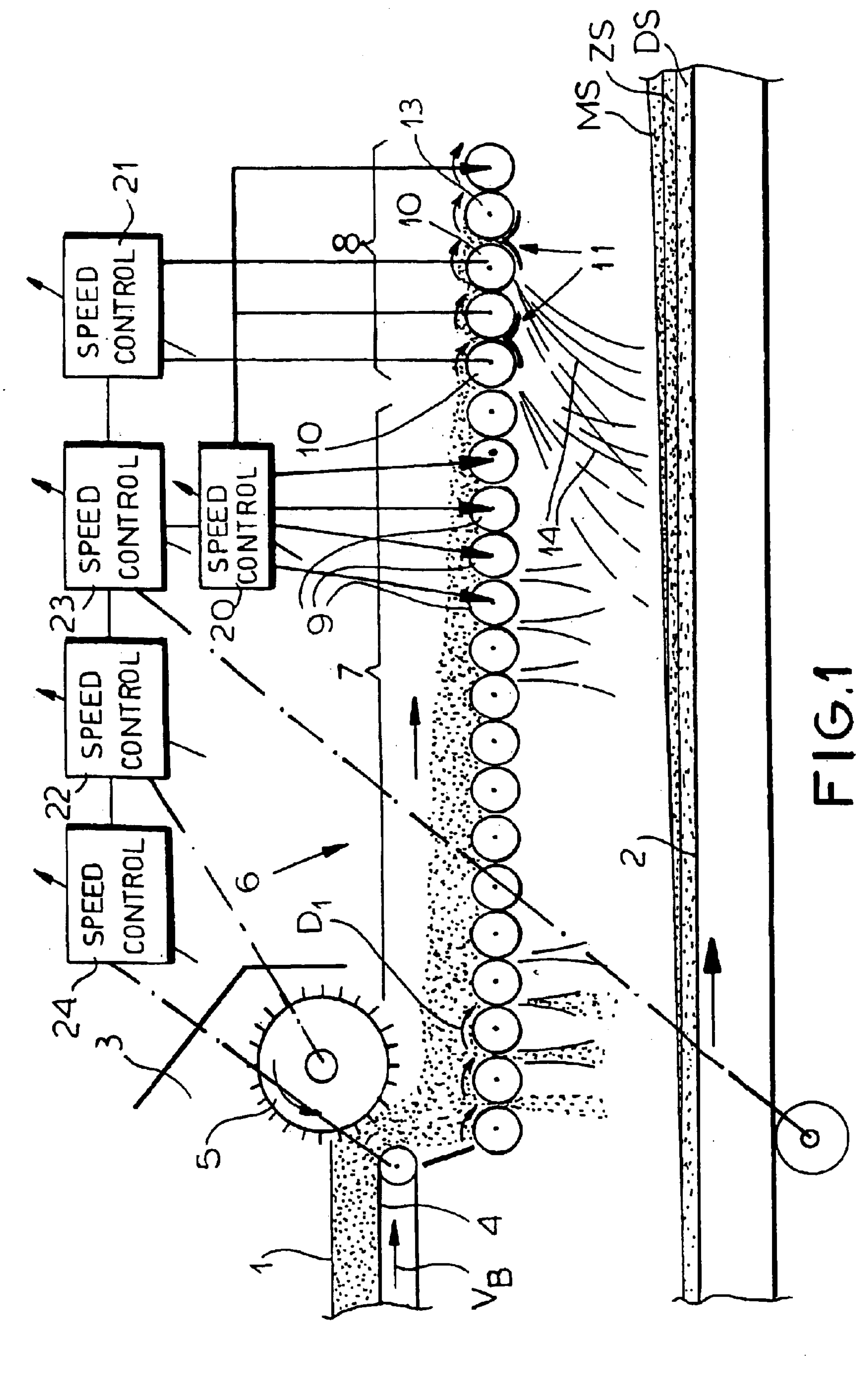
FIG. 1 is a diagrammatic side elevational view of a spreader according to the invention.
Figure 2:
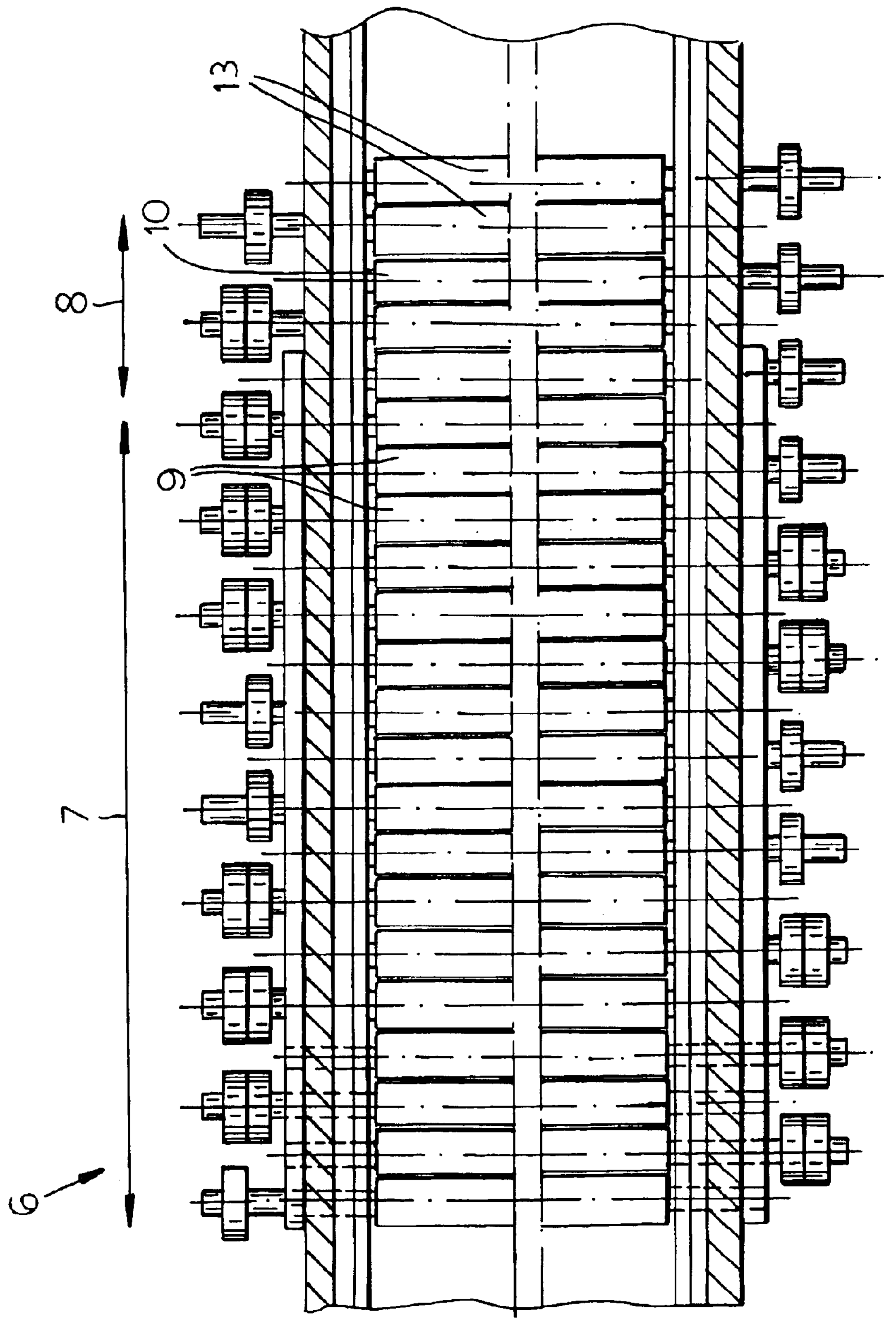
FIG. 2 is a plan view thereof in the region of the roller array.

In the drawing there is shown a spreader for the spreading of glue-coated particulate material 1, especially wood chips, wood fibers, sawdust or the like, on a conveyor belt 2 to form a mat which can be used for the production of chipboard, fiberboard or a like particleboard utilizing wood particles.

The spreader has a bin 3 containing the spreadable material and a dosing unit which is comprised of a dosing or feed belt 4 and a dosing roller 5 for metering the flow of the spreadable material onto an array 6 of rollers forming a spreading head extending above the belt and conveying the spreadable material across the tops of these rollers in the same direction as the direction of displacement of the belt. The array of rollers is subdivided into a fine-material spreader part 7 and a coarse-material spreader part 8 located downstream of the fine-material part. The roller array 6 and the belt 2 are substantially horizontal. The rollers 9 of the array 6 are all driven in the same rotational sense.

The rollers 9 of the fine-material part 7 are rotated with the same speed $D_1$ which may be varied by a speed control 20. The coarse-spreader part 8 has, in the embodiment shown, two spreader rollers 10 which are rotated at the higher speed $D_2$ by the speed control 21 which, as can be seen in FIG. 1, is coupled to the speed control 20 so that the increased speed $D_2$ will be maintained higher than the speed of the roller 9 by a given but variable factor.

Below the spreader rollers 10 are baffles 11 which scatter the coarse particles backwardly, i.e. against the travel direction of the spreadable material on the roller array 6 and the travel direction of the belt 2, and thus in part below the fine-material spreader part 7. In this embodiment, since a single array of rollers in a single plane is provided, the array 6 can be considered a simple roof over the belt. Additional arrays of spreading rollers can be provided as has been described to provide additional layers for the mat.

Figure 4:
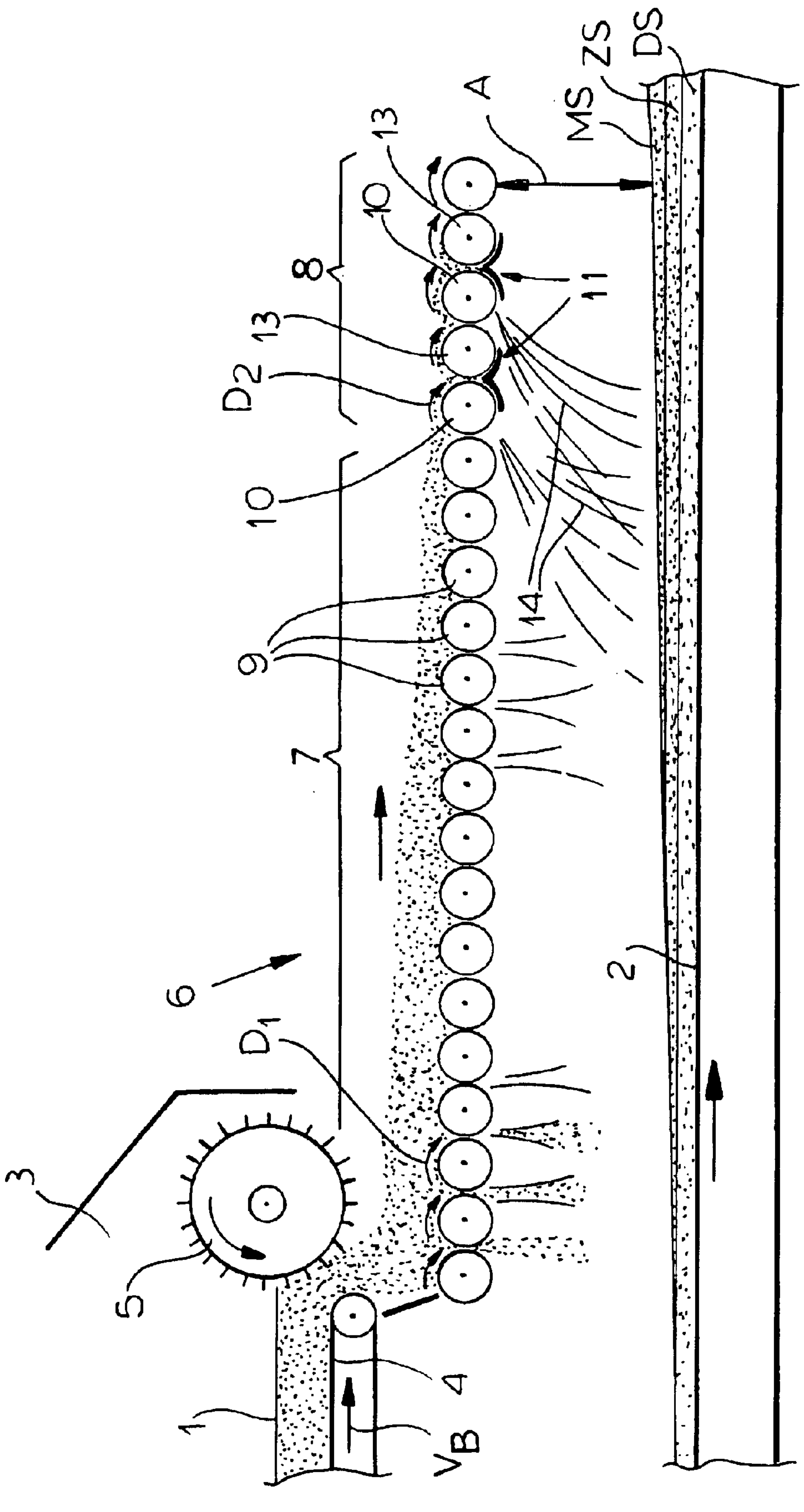
FIG. 4 is a view similar to that of FIG. 1 showing the application of the spreader of FIG. 1 predominantly as a middle layer spreader.

In the embodiment of FIG. 1, the spreader first forms the cover layer DS and then a middle layer MS with the one array. Other spreaders can be provided to form additional middle layers and/or an upper cover layer. In the embodiment of FIG. 4, the spreader forms on the cover layer DS which can be deposited by another spreader upstream of the one shown, an intermediate layer ZS of fine material and an intermediate layer MS in the form of a mixture of fine material and coarse material. In a further step, not shown in the drawing, another spreading unit can apply further middle layers, an intermediate layer and a cover layer. The machine shown in FIG. 4 is thus a middle layer machine in two zones. The use of the intermediate layer is advantageous since they isolate the coarser material and prevent the coarser material from being visible at the surfaces of the board.

The baffle 11 (FIG. 3) has a guide surface 12 at a predetermined distance a from the respective roller 10 which is driven at the higher speed and with a curvature corresponding to that roller 1 directed rearwardly. Between the higher speed rollers 10 is a spreader roller 13 which can be driven at the speed $D_1$ of the spreader rollers 9 of the fine-spreader part. These rollers serve to minimize any interference with the backscattering trajectories 14 (FIG. 1).

The spacing between the spreading rollers 9 of the fine-spreading part 7 can increase at least toward the end of that part of the array. The roller 5 can be driven by a speed control 22 while the belt 2 can be driven by a speed control 23, both of which are variable. The roller 5 has a speed higher by a predetermined degree than the speed of the rollers 9 and sufficient to ensure that the spreadable material will reach the end of the coarse-spreading part 8.

Figure 3:
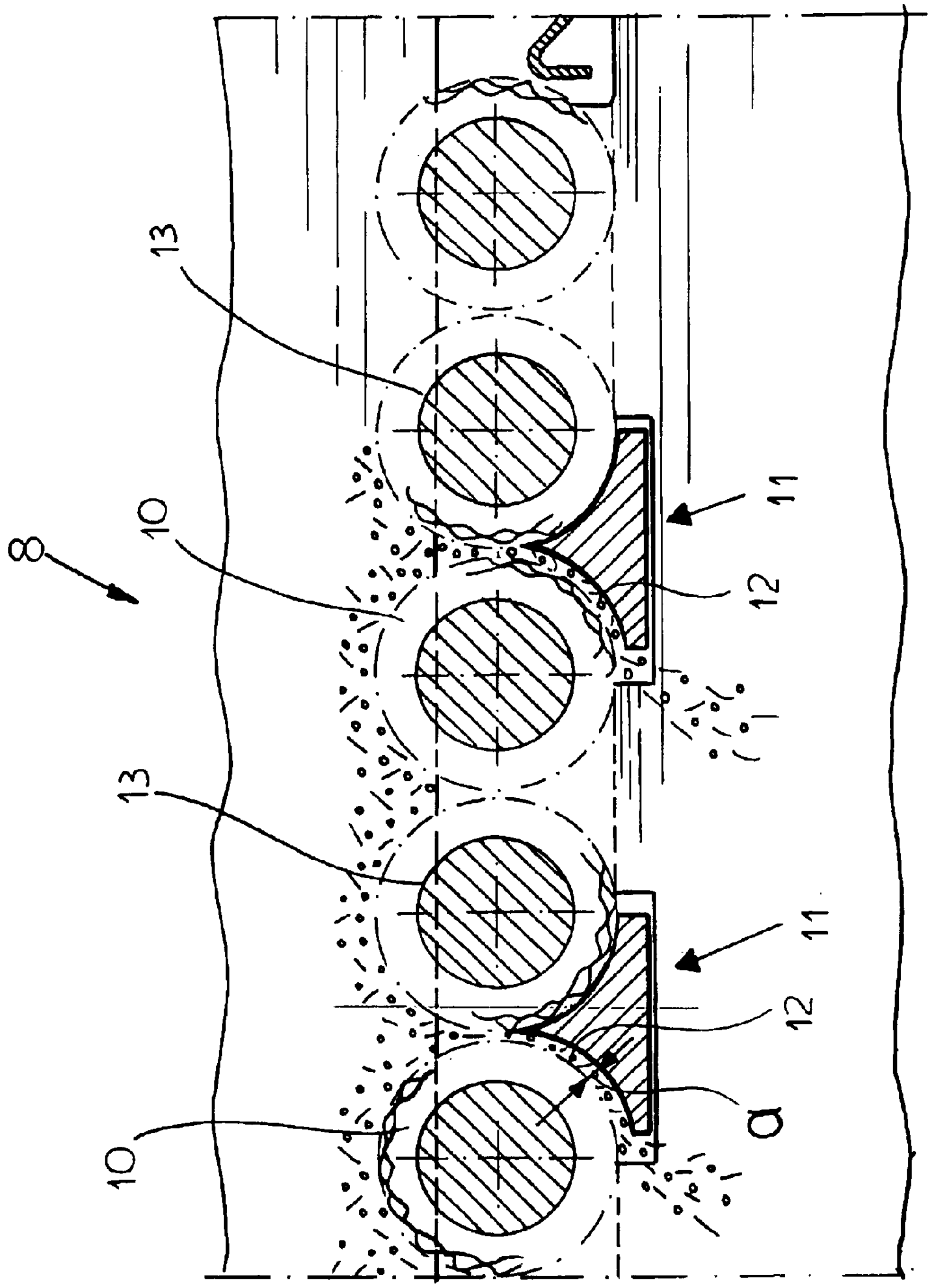
FIG. 3 is a detail section in the region of the faster-operating rollers for spreading the coarse material.

In the embodiment shown the roller 5 can operate with a speed of about 60 RPM and can be driven in the opposite sense from the rollers 9, 10 and 13. The slower rollers 9 and 13 and the faster rollers 10 are driven in the same direction. The speed $D_1$ can be about 5 RPM to 25 RPM while the speed $D_2$ can be 150 RPM to 200 RPM. The speed $D_2$ can be 6 to 40 times greater than the speed $D_1$. The diameters of all of the rollers 9, 10, 13 can be identical and in a suitable embodiment can be about 90 mm and the surfaces of these rollers can be roughened or toothed as shown in FIG. 3.

The distance A can amount to 400 mm to 500 and will depend on the nature of the material to be spread. The spread $V_B$ of the belt 4 and the speeds $D_1$ and $D_2$ can be varied with controls as has been shown. The speed of the rollers 9 and 10 can be coupled to the speed VB via the additional speed control 24 so that, should the speed of the dosing belt 4 be increased by a certain amount, the speeds of the spreading rollers will be increased by the same factor.

Tests have shown that in the initial stages of the roller array, relatively small amounts of the fine material cascade onto the belt, and as the material passes along the rolling array there is a critical point at which the material loosens up and deposits more or less suddenly through the rollers. From a more compact front of the material on the collecting belt, the material forms a loose front after about say ⅔ the length of the array. This material cascades over a comparatively short path onto the belt. With the system of the invention and backscattering of the coarse material in this region, the middle layer is formed with a particularly intimate mixture of fine and coarse materials.

I claim:

1. A spreader for producing a layer of spreadable material, said spreader comprising:

a conveyor belt adapted to receive a layer of a spreadable material;

a storage bin above said belt and containing a quantity of spreadable material;

a dosing device receiving spreadable material from said storage bin and depositing spreadable material in a layer on said conveyor belt, said dosing device comprising an array of mutually parallel spreading rollers extending generally transversely of a direction of displacement of said belt and between which said spreadable material is scattered onto said belt, said spreadable material passing over said array of rollers, said array of rollers including a fine-material spreading portion within which a fine material fraction of said spreadable material is scattered onto said belt and a coarse-material spreading portion in which a coarse material fraction of said spreadable material is scattered onto said belt;

a drive for driving at least one of said spreading rollers in said coarse-material spreading portion at an angular velocity higher by a predetermined amount than that said spreading rollers of said fine-material spreading portion; and a deflector beneath said one of said spreading rollers for directing scattered material from said one of said spreading rollers back opposite said direction into a region below said fine-material spreading portion.

2. The spreader defined in claim 1 wherein said deflector has a surface at a predetermined distance from said one of said spreading rollers and curved correspondingly to a surface of said one of said spreading rollers.

3. The spreader defined in claim 2 wherein said coarse-material spreading portion is provided with a plurality of spreading rollers driven at an angular velocity higher by a predetermined amount than that of said spreading rollers of said fine-material spreading portion and each of which has a deflector therebeneath for directing scattered material back opposite said direction into said region below said fine-material spreading portion.

4. The spreader defined in claim 3 wherein each deflector is a baffle formed with a coarse-material guide surface.

5. The spreader defined in claim 3 wherein a spreading roller driven with the angular velocity of the spreading rollers of the fine-material spreading portion is provided between each two spreading rollers driven at the higher angular velocity.

6. The spreader defined in claim 3 wherein a spacing between the spreading rollers of said fine-material spreading portion increases at least in a region thereof toward an end of said fine-material spreading portion.

7. The spreader defined in claim 3 wherein said dosing device further comprises a dosing roller feeding spreadable material from said bin onto said spreading roller and driven with an angular velocity which is higher than the angular velocity of the spreading rollers of said fine-material spreading portion.

8. The spreader defined in claim 7 wherein the angular velocity of said dosing roller is 2 to 12 times higher than the angular velocity of the spreading rollers of said fine-material spreading portion.

9. The spreader defined in claim 7 wherein said one of said rollers is driven at an angular velocity which is 2 to 50 times greater than the angular velocity of the spreading rollers of said fine-material spreading portion.

10. The spreader defined in claim 9 wherein said one of said rollers is driven at an angular velocity which is 5 to 40 times greater than the angular velocity of the spreading rollers of said fine-material spreading portion.

11. The spreader defined in claim 10 wherein said spreading rollers of said fine-material spreading portion are driven at 5 to 50 revolutions per minute.

12. The spreader defined in claim 10 wherein said spreading rollers of said fine-material spreading portion are driven at 5 to 25 revolutions per minute.

13. The spreader defined in claim 12 wherein said one of said spreading rollers is driven at an optionally variable speed from 100 revolutions per minute to 250 revolutions per minute.

14. The spreader defined in claim 13 wherein said speed is 150 revolutions per minute to 200 revolutions per minute.

15. The spreader defined in claim 14 wherein the adjustable speed of said one of said spreading roller is coupled to an adjustable speed of a dosing belt below said bin.

16. A spreader for producing a layer of spreadable material, said spreader comprising:

a conveyor belt adapted to receive a layer of a spreadable material;

a storage bin above said belt and containing a quantity of spreadable material, a dosing device receiving spreadable material from said storage bin and depositing spreadable material in a layer on said conveyor belt, said dosing device comprising an array of mutually parallel spreading rollers extending generally transversely of a direction of displacement of said belt and between which said spreadable material is scattered onto said belt, said spreadable material passing over said array of rollers, said array of rollers including a fine-material spreading portion within which a fine material fraction of said spreadable material is scattered onto said belt and a coarse-material spreading portion in which a coarse material fraction of said spreadable material is scattered onto said belts; and a drive for driving at least one of said spreading rollers in said coarse-material spreading portion at an angular velocity higher by a predetermined amount than that said spreading rollers of said fine-material spreading portion, said coarse-material spreading portion being provided with a plurality of spreading rollers driven at an angular velocity higher by a predetermined amount than that of said spreading rollers of said fine-material spreading portion and each of which has a deflector therebeneath for directing scattered material back opposite said direction into a region.

17. The spreader defined in claim 1 wherein said dosing device further comprises a dosing roller feeding spreadable material from said bin onto said spreading rollers and driven with an angular velocity which is higher than the angular velocity of the spreading rollers of said fine-material spreading portion, the angular velocity of said dosing roller being 2 to 12 times higher than the angular velocity of the spreading rollers of said fine-material spreading portion.

* * * * *